United States Patent

Mang

Patent Number: 5,341,849
Date of Patent: Aug. 30, 1994

[54] FUEL SYSTEM CONDUIT

[75] Inventor: Warren Mang, Haddonfield, N.J.

[73] Assignee: Markel Corporation, Norristown, Pa.

[21] Appl. No.: 788,208

[22] Filed: Nov. 5, 1991

[51] Int. Cl.$^5$ .............................................. F16L 11/00
[52] U.S. Cl. ...................................... 138/133; 138/136; 138/154; 138/DIG. 3
[58] Field of Search ................. 138/DIG. 3, 129, 134, 138/135, 136, 103, 154, 150, DIG. 3, 133, 130, 132; 361/215

[56] References Cited

U.S. PATENT DOCUMENTS

| | | | |
|---|---|---|---|
| 1,893,120 | 1/1933 | Zapf | 138/134 X |
| 2,034,561 | 3/1936 | Davis | 138/134 X |
| 3,086,556 | 4/1963 | Kantzer | 138/134 X |
| 3,117,597 | 1/1964 | Fritz et al. | 138/132 |
| 3,359,822 | 12/1967 | Hurlow | 138/134 X |
| 4,172,474 | 10/1979 | Stahl | 138/132 |
| 4,196,464 | 4/1980 | Russell | 361/215 |
| 4,303,457 | 12/1981 | Johansen et al. | 361/215 X |
| 4,394,705 | 7/1983 | Blachman | 138/103 X |
| 4,403,631 | 9/1983 | Abdullaev et al. | 138/134 X |
| 4,522,235 | 6/1985 | Kluss et al. | 138/130 |
| 4,800,928 | 1/1989 | Kano | 138/136 X |
| 5,124,878 | 6/1992 | Martucci | 361/215 |

FOREIGN PATENT DOCUMENTS

| | | | |
|---|---|---|---|
| 147520 | 11/1979 | Japan | 138/130 |
| 84798 | 1/1917 | Switzerland | 138/134 |

Primary Examiner—Frankie L. Stinson
Attorney, Agent, or Firm—Synnestvedt & Lechner

[57] ABSTRACT

An improved fuel system conduit is disclosed. The fuel system conduits comprise an inner tubular liner and a substantially tubular cover comprising a metal band helically wrapped around said liner for covering and protecting the liner. The helical or spiral wrap allows fuel line flexibility while simultaneously inhibiting kinking. The helical wrap may also be covered by a plastic outer sheath.

18 Claims, 2 Drawing Sheets

FUEL SYSTEM CONDUIT

This invention is directed to fuel systems conduits, and more particularly to kink-resistant fuel system conduits having a high degree of flexibility, exceptional resistance to chemical and heat induced degradation and excellent resistance to vapor permeability.

Conduits for transporting fuel to the engines of cars, buses, boats, airplanes and the like are important components of the fuel delivery systems of such vehicles. Likewise, the conduits which transport fuel vapors are also important components of such fuel delivery systems. These conduits must possess a variety of characteristics which allow the conduit to perform in the sever and hostile physical environment of the vehicle engine compartment and chassis.

For example, the conduit must be capable of withstanding internal exposure to chemical agents, such as fuels and fuel additives, and external exposure to agents such as road salts, undercoating materials, lubricants and a variety of other fluids. Furthermore, fuel system conduits are required to be sufficiently flexible to conform to circuitous routings. These routings also frequently place the fuel conduit in a position where it is exposed to impact by gravel and/or road debris that is projected from the road surface during movement of the vehicle. Thus, the fuel conduit should be puncture resistant. It is also possible that the fuel conduit may contact moving components, edges or rough surfaces during vehicle operation. Thus, the conduit should also be abrasion resistant.

In the past, fuel hoses had been formed from rubber or similar materials. Unfortunately, as gasoline flows through the high temperature engine compartment of a vehicle, it tends to oxidize and form peroxides. Gasoline containing peroxides formed by such heat is called "sour gasoline". Sour gasoline tends to degrade conventional fuel lines. The degrading effects caused by sour gasoline are exacerbated by the pressure applied to fuel lines by modern fuel injection systems. Because of the sour gasoline phenomenon, conventional rubber fuel lines degrade quickly and do not have a sufficient service life. Fuel line deterioration can constitute a serious safety and environmental hazard.

The need for fuel conduits which are resistant to vapor and liquid permeability and to chemical degradation has recently become even more acute due to increasingly stringent environmental regulations and to the increased emphasis on the development and use of oxygen containing compounds in fuels and fuel additives. For example, there has been a strong emphasis in adapting automotive fuel systems to safely accept fuels containing larger concentrations of volatile oxygen containing materials, such as ethanol and methanol. These and other compounds tend to severely degrade the materials heretofore used in fuel system conduits.

Attempts have heretofore been made to overcome the deficiencies exhibited by fuel hoses comprised of rubber, nylon and like material. For example, fuel conduits comprising a fluoropolymer inner layer and a braided fiberglass or stainless steel outer layer have heretofore been proposed. Conduits of this type typically comprise a relatively thick wall (25-35 mil) polytetrafluoroethylene (PTFE) liner. Although such conduits are generally acceptable from a performance standpoint, significant disadvantages are associated with the use of such designs. For example, braiding machinery is expensive and complex, and the use of such machinery results in an expensive fuel conduit. Furthermore, the process of braiding over a PTFE tube may tend to expose the tube to stresses which cause undesirable kinking or discontinuous deformation. Such kinking of the PTFE tube is highly detrimental since it tends to substantially reduce the resistance of the PTFE material to vapor permeation. Thus, the braiding process itself may negate one of the principal reasons for using PTFE liners in fuel conduits. Even if the braiding process does not kink the liner, the braiding, once applied, is unsatisfactory in that it is not particularly effective in preventing kinking of the conduit during use or installation. It is believed that this drawback of the braided product is one of the reasons that thick-walled PTFE liners have heretofore been used. That is, relatively thin-walled PTFE liners are more susceptible to kinking than thick-walled liners. Of course, PTFE is a relatively expensive material, and the use of thick-walled PTFE adds to the expense of the resulting fuel conduit.

Accordingly, it is an object of the present invention to provide a low-cost fuel system conduits having mechanical integrity, resistance to chemical degradation and resistance to vapor permeation.

It is a further object of the present invention to provide fuel system conduits having liners comprising fluorocarbon resin.

It is a further object of the present invention to provide fuel system conduits which are both flexible and relatively kink-resistant.

It is a further object of the present invention to provide flexible and kink-resistant fuel system conduits having liners comprising fluorocarbon resin.

It is yet another object of the present invention to provide methods for forming tubular conduits in which an inner plastic liner thereof has not been subject to deleterious kinking or deformation during the manufacturing process.

SUMMARY OF THE INVENTION

These and other objects of the present invention are satisfied by fuel system conduits comprising an inner tubular liner and a metal band helically wrapped around said liner for covering and protecting the liner. The helical or spiral wrap allows fuel line flexibility while simultaneously inhibiting kinking. According to preferred embodiments, the helical wrap is covered by a plastic outer sheath, preferably a polyamide outer sheath.

DETAILED DESCRIPTION OF THE PREFERRED EMBODIMENTS

Figure 1:
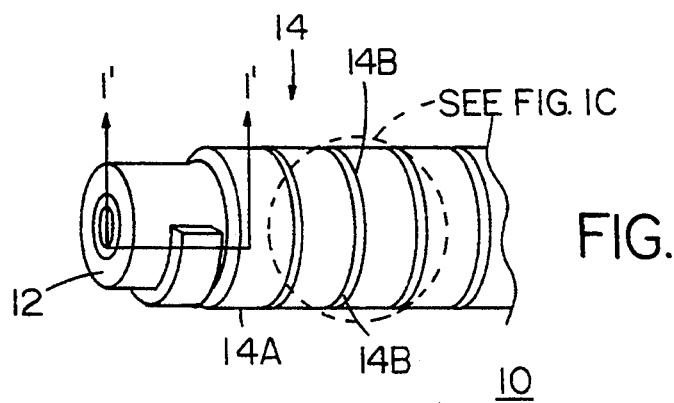
FIG. 1 is a perspective view of a fuel system conduit according to a first embodiment of the present invention.

The fuel system conduits of the present invention comprise two essential elements: an inner tubular liner and a helically wrapped band which forms a protective tubular cover for said inner tubular liner. The term "tubular" is used herein in a broad sense to refer to an elongate vessel having a chamber or opening therein running substantially along the length of the vessel. It will be appreciated that the shape of the vessel and the chamber therein can vary within the scope hereof. In general, however, the vessel will be substantially cylindrical, having a circular cross-sectional configuration.

Applicants have discovered that the combination of the elements required by the present invention produces unexpected and beneficial results. In operation, the inner tubular liner will contain and be in contact with fuel and/or fuel vapors. As a result, a primary function of the liner is to ensure that the fuel or fuel vapor is transported to its desired destination without leakage. It is also required that the conduit be capable of performing this function effectively after many years of use. Applicants have discovered that the utilization of an outer protective cover comprising a helically wrapped band, and preferably a tightly wrapped helical band, allows the use of an inner tubular liner which requires little or no inherent capacity to maintain its shape or resist internal pressure. As a result, the present inner liners may be selected and configured so as to minimize vapor and liquid permeation and to maximize chemical resistance. Furthermore, the cost of the inner tubular liner can be minimized. That is, the inner liner may advantageously be a thin-walled liner without sacrificing the performance characteristics of the conduit. According to especially preferred embodiments, therefore, the inner liner comprises a thin-walled liner, and preferably a thin-walled liner comprised of fluorocarbon resin. As the term is used herein, "thin-walled liner" refers to liners having a wall thickness of no greater than about 25 mil. Applicants have found that liners having a wall thickness of from about 5 to about 15 mil are especially preferred.

As will be appreciated by those skilled in the art, the inner tubular liner of the present conduits should possess flexibility, thermal and chemical stability, and a high degree of resistance to vapor permeability. A large number of materials satisfy these requirements and may be used according to certain embodiments of this invention. It is generally preferred, however, that the inner tube or liner of the present conduit comprise a product formed from a resin of fluorocarbon polymer. As is well known, fluorocarbon polymers are a class of paraffinic polymers which have some or all of the hydrogen replaced by fluorine. The inner tubes of the present invention thus are formed from materials comprising fluorocarbon resin selected from the group comprised of polytetrafluoroethylene (PTFE), fluorinated ethylene propylene copolymer (FEP), perfluoroalkoxy (PFA) resin, polychlortrifluoroethylene (PCTFE), ethylenetrichlortrifluoroethylene copolymer (ECTFE), ethylenetetrafluoroethylene copolymer (ETFE), polyvinylidene fluoride (PVDF), polyvinyl fluoride (PVF), and mixtures of one or more of these. While it is contemplated that all of the above fluorocarbon polymers, including homopolymers, copolymers, block and graft copolymers of any of the above, may be used, PTFE resin is preferred.

According to preferred constructions, the inner tube is a composite tube comprised of an outer portion formed of PTFE resin and an inner portion formed of a mixture of PTFE and semiconductive carbon.

Although the preferred liners of the present invention provide the beneficial features described above, such features would not be particularly advantageous in the absence of the flexibility and kink-resistance provided by the helically wrapped band of the present invention. In particular, Applicants have surprisingly found that a helically wrapped band, and preferably a tightly wrapped helical band, provides excellent flexibility and exceptional resistance to kinking. As the term is used herein, "tightly wrapped helical band" refers to a helical band formed into a generally tubular shape in which the edges of the band are in close abutting relationship. Such a tightly wrapped helical band is illustrated in FIGS. 1-4.

Although Applicants do not intend to be bound by or limited to any particular theory of operation, the kink resistance of the present fuel system conduits is provided, at least in part, by the helically wrapped band. In particular, it is believed that the kink-resistance stems from the tendency of the helically wrapped bands, and especially tightly wrapped bands, to form continuous shapes when exposed to bending stresses. As a result, the inner tubular liner is protected from discontinuous deformations which would otherwise result from bending of the fuel conduit. This property is especially important according to the preferred aspects of the present invention since thin-walled PTFE liners are especially susceptible to kinking upon the application thereto of bending stresses.

Although it is contemplated that a large number of materials may find beneficial use in forming the helically wrapped band, the use of a metal band is contemplated. It is to be appreciated by those skilled in the art that a number of metals including carbon steel, stainless steel, aluminum, copper, iron or nickel may be utilized as the metallic band of the present invention, with carbon steel being preferred for its processability, resiliency, strength, ready availability and low cost.

Applicants have also found that the helical wrap of the present invention, and especially helical wrap formed from a metallic band, imparts sufficient mechanical strength to the overall conduit to withstand the maximum internal pressures normally experienced by such conduits in automotive use. In particular, it is contemplated that fuel system conduits constructed according to the teachings of the present invention are capable of withstanding internal pressures of up to about 1000 psi without deterioration of the performance properties, including the mechanical stability, thereof.

It will be appreciated by those skilled in the art that the particular shape and dimension of the present fuel system conduits and the elements thereof may vary widely within the scope hereof. It is generally preferred, however, that the inner tubular liner be substantially circular in cross-section and have an inner diameter of from about 0.3 to about 0.4 inch and a wall thickness of from about 5 to about 25 mil, with 10-20 mil being even more preferred. It will be appreciated, of course, that other cross-sectional configurations for the inner liner may be adaptable for use within the teachings hereof.

The metal band which forms the helical wrap of the present invention may likewise take a variety of shapes and sizes within the scope hereof. For example, it is contemplated that the metal band may comprise a flat metal ribbon having a rectangular cross-section configuration and a thickness of from about 0.02 inch to about 0.04 inch, with a thickness of from about 0.02 to about 0.03 being even more preferred. The band also preferably has a width of from about 0.06 inch to about 0.2 inch, and even more preferably of from about 0.1 to about 0.125, as described more fully hereinafter in connection with the FIGS. 1–4. It is contemplated, however, that the metal band may take other cross-sectional configurations. For example, the cross-section of the metal band may be substantially circular. For embodiments in which the fuel conduit is to be used in especially environmentally harsh conditions or under unusually high internal pressures, it may be preferred for the cross-section of the steel band to have a stepped configuration or an "S" shaped configuration which provides for overlap and/or interlocking between adjacent sections of the band when wound in the helical configuration.

Although it is contemplated that the pitch of the spiral windings which comprise the protective tubular cover of the present invention may vary within the scope hereof, it is especially preferred that the protective tubular cover comprise spiral or helical windings having a pitch equivalent to about the inverse of the width or diameter of the steel band. In other words, it is preferred that the steel band be wound such that the adjacent edges of the band are in abutting relationship to one another. In this way, the helically wound band will substantially completely cover and protect the inner liner of the present invention. For embodiments in which the inner liner has an inner diameter of from about 0.3 to about 0.4 inch and the metal band comprising the helical wrap is rectangular in cross-section, it is preferred that the width of the band be preferably from about 0.1 to about 0.13 inch.

According to preferred embodiments of the present invention, the fuel conduit comprises a plastic cover surrounding the helical wrap. Such a plastic cover is especially preferred in embodiments wherein the metal comprising the helical wrap is subject to rust and corrosion as a result of exposure to moisture and other corrosion causing chemicals. In this way, the plastic cover protects the metallic portions of the fuel liner from corrosion which would otherwise deteriorate the mechanical strength and integrity of the fuel conduit. While numerous plastic materials are contemplated for use in connection with this outer cover, the outer cover preferably comprises an extruded polyamide tube, and preferably polyamide resins such as nylon 11 and nylon 12, available for example, from Autochemie. The polyamide outer casing is preferably applied by extruding the resin over the helically wrapped band.

It is contemplated that conduits according to the present invention may be produced according to a number of known techniques, and conduits manufactured using any of these techniques are within the scope hereof. It is preferred however, that the conduit be formed by first providing an inner tube or liner, and preferably a thin-walled PTFE liner. This liner is then helically wrapped with a metal band to provide a protective cover for the liner. The wrapping operation produces a substantially tubular product by permanently deforming the metal band into a tight helical winding. It is especially preferred that the wrapping operation comprises winding the metal band over the liner. This preferred wrapping step is conveniently carried out using well known concentric tapping and lapping equipment, such as is sold by the Wafios Machinery Corporation of Bradford, Conn.

Figure 2:
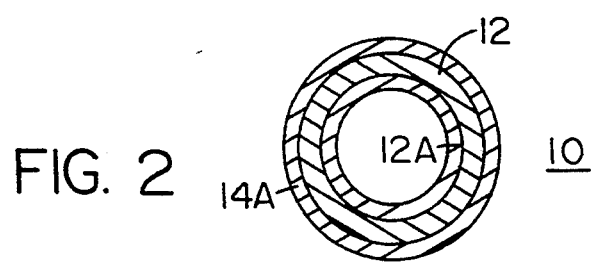
FIG. 2 is a cross-section view of the fuel system conduit of FIG. 1.

A preferred fuel conduit according to a first embodiment of the invention will now be described in connection with FIGS. 1–2. The fuel conduit, designated generally as 10, comprises an inner tubular liner 12 having a substantially circular cross-sectional configuration. Liner 12 is preferably relatively thin-walled, having a wall thickness of about 15 mil. The liner 12 also preferably comprises a tubular product formed of PTFE resin. The interior surface of inner tube 12 is formed with a layer of semiconductive carbon 12A. The semiconductive carbon 12A functions as an electrical ground and prevents the creation of potentially hazardous electrical sparks within the line.

Liner 12 is surrounded by an outer protective cover 14 comprising helically wrapped band 14A. According to the embodiment shown in FIGS. 1–2, band 14A is tightly wound around liner 12 such that adjacent edges 14B of band 14A are in close abutting relationship. As shown in the figures, it is preferred that the inner surface of band 14 be in close abutting relationship with the outer surface of inner liner 12. That is, an interference fit preferably exists between protective cover 14 and inner liner 12.

Figure 1A:
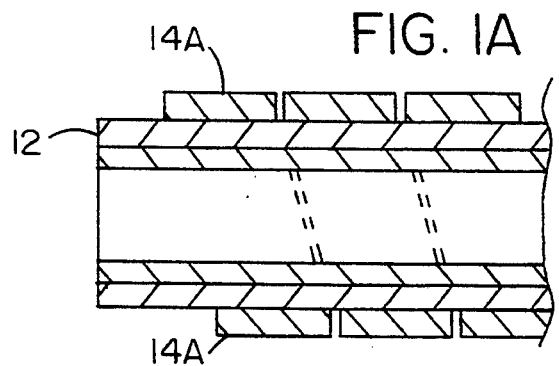
FIG. 1A is a cross-sectional view taken along line 1'—1' of the fuel system conduit shown in FIG. 1 showing an embodiment comprising a band having a rectangular cross-section.

Three possible cross-sectional configurations for the band 14 will now be discussed in connection with FIGS. 1A, 1B, 1D and 1E. With particular reference now to FIG. 1A, a band having a rectangular cross section is illustrated. A tight helical configuration in which the adjacent edges of rectangular band 14 are in abutting relationship, as shown in FIG. 1A, exists for conduits in a straight, unbent configuration. When the conduit is bent or stressed, the protective cover 14 absorbs the bending stress by a slight spreading of the adjacent band edges 14B in the area of the bend. This spreading of the edges is shown, greatly enlarged and exaggerated for clarity, in FIG. 1C. Applicants have found that a band with such a rectangular cross sectional configuration will provide adequate protection for many liners despite this spreading phenomenon. This is because the degree of spread or gap of adjacent edges is generally quite small even for relatively tight radius bends.

Figure 1B:
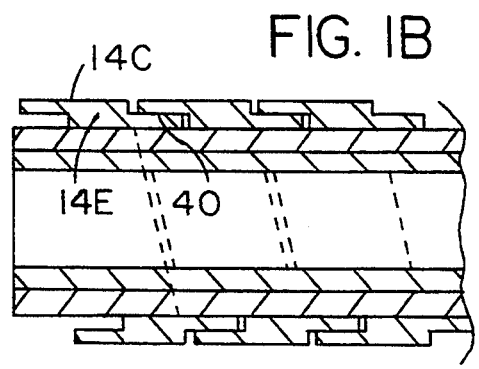
FIG. 1B is a cross-sectional view showing a fuel system conduit having a stepped helical band.
Figure 1C:
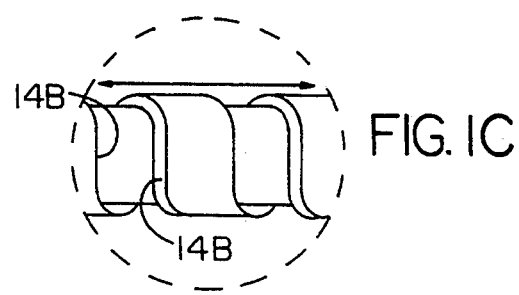
FIG. 1C is an enlarged perspective view of an isolated portion of the fuel system conduit of FIG. 1.

For some applications, this spreading phenomenon can be disadvantageous. For conduits exposed to high internal pressures, for example, the liner 12 may tend to extrude from between the adjacent edges 14B of a rectangular band 14. Furthermore, such gaps may be undesirable for liners used in environments especially susceptible to impact by projected road debris. Protective covers 14 comprised of helically wrapped bands 14A of the type shown in FIG. 1B are therefore preferred for use in such applications. The band 14 shown in FIG. 1B has a stepped cross-sectional configuration such that overlap exists between adjacent edges of the band. In particular, band 14 comprises upper ledge 14C and lower ledge 14D connected by intermediate portion 14E. In tightly wrapped helical covers comprising a band with such a configuration, the upper ledge 14C of the band overlays the lower ledge of 14D of the adjacent edge of the band. It will be appreciated that in such embodiments, the spreading phenomenon referred to above will not result in an exposed gap between adjacent edges of the band. As a result, protection of the inner liner 12 from projected road debris and the like is maximized while the tendency of the inner liner 12 to extrude from between gaps in adjacent edges is minimized.

While the above noted embodiments are preferred for many applications, Applicants contemplate that it many be desirable in some cases to provide the fuel conduit with an increased ability to withstand longitudinal stretching when subject to tensile stress. It will be appreciated that the ability of the conduit to withstand longitudinal stretching is imparted, at least in part, by the tendency of the helical band to remain in the coiled configuration. According to ceratin embodiments, this resistance to longitudinal stretching is preferably supplemented by the use of bands which have an S-shape cross-sectional configuration. Applicants have found that such a configuration provides an interlock between adjacent edges of the band such that resistance to stretching is greatly increased. Furthermore, such interlocked, S-shaped bands also help prevent any tendency of the liner 12 to extrude from between the adjacent edges 14B of the 14, as well as providing improved protection against impact by projected road debris.

Figure 1D:
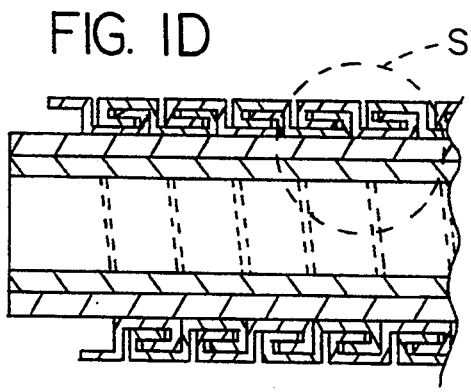
FIG. 1D is a cross-sectional view taken along line 1'—1' showing an embodiment comprising a band having an "S" shaped cross-section.
Figure 1E:
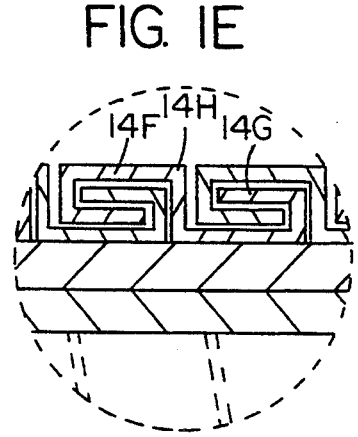
FIG. 1E is an enlarged cross-sectional view of the "S" shaped band of FIG. 1D.

With particular reference to FIGS. 1D and 1E, the band 14 has an inter-locking, S-shaped cross-sectional configuration comprising upper hooked portion 14F and lower hooked portion 14G connected by intermediate portion 14H. The lower hooked portion 14G is inter-locked with the upper hooked portion 14F of an adjacent edge. The tapping and lapping equipment described above is operated according to well known techniques to produce such an interlocked configuration.

Figure 3:
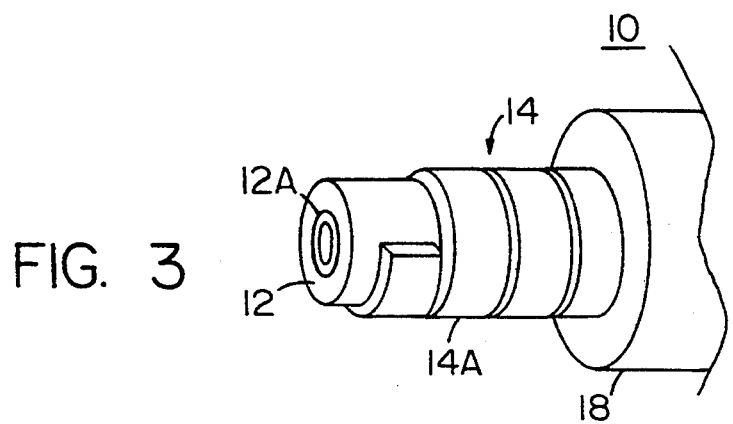
FIG. 3 is a perspective view of a fuel system conduit according to a second embodiment of the present invention.
Figure 4:
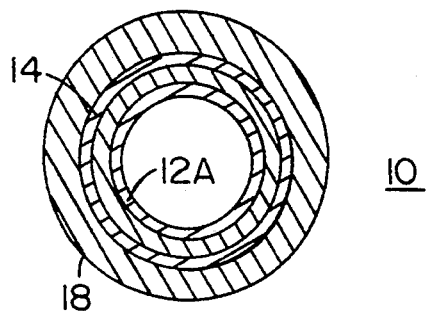
FIG. 4 is a cross-section view of the fuel system conduit of FIG. 3.

With reference now to FIGS. 3 and 4, a second embodiment comprising a conduit with a protective outer sheath is shown. As with the embodiment of FIGS. 1-2, the fuel conduit is designated generally as 10 and comprises an inner tubular liner 12 surrounded by an outer protective cover 14 comprising helically wrapped band 14A. The details of the liner 12 and the cover 14 may be the same as previously described. An outer sheath 18 is provided to protect the band 14, which is preferably a metal band, from moisture and other corrosion causing agents. While it is contemplated that the conduit may be protected from such corrosion by forming the band from a corrosion resistant metal, such as stainless steel, this may be overly expensive for certain embodiments. It is preferred, therefore, that a plastic outer sheath 18 be provided. The inner surface of outer sheath 18 is preferably in close abutting relationship with the outer surface of protective cover 14. That is, an interference fit preferably exists between protective cover 14 and outer sheath 18. It is also preferred that the outer sheath be configured so as to not detract from the flexibility of the conduit.

While the present invention has been described with reference to the enclosed Figures and preferred embodiments, it will be appreciated that other embodiments are within the scope hereof, which is to be determined with reference to the claims appended hereto.

What is claimed is:

1. An improved fuel system conduit for transporting fuel and/or fuel vapors in an automobile comprising:

an inner tubular liner having a central chamber for contacting and containing the fuel and/or fuel vapor, said inner tubular liner comprising a thin-walled tubular liner, having a wall thickness of from about 5 to about 25 mils formed of fluorocarbon resin and having a circular cross sectional configuration; and a protective cover for said liner comprising:

a metallic ribbon tightly wrapped in a helical configuration around said inner liner such that said inner liner is protected from kinking upon the application of bending stresses to said conduit, said ribbon having a generally rectangular cross-sectional configuration; and an outer plastic sheath substantially covering said metallic ribbon.

2. The improved conduit of claim 1 wherein said metallic ribbon comprises a carbon steel ribbon.

3. The improved conduit of claim 1 wherein said metallic ribbon has a width of from about 0.06 to about 0.2 inch and a thickness of from about 0.02 to about 0.04 inch.

4. The improved conduit of claim 1 wherein said inner tubular liner has an inner diameter of from about 0.3 to about 0.4 inch.

5. The improved conduit of claim 1 wherein said inner tubular liner has a wall thickness of from about 10 to about 20 mil.

6. The improved conduit of claim 1 wherein said outer sheath comprises polyamide.

7. The improved conduit of claim 1 wherein said inner liner has an interior layer of semi-conductive carbon.

8. The improved conduit of claim 1 wherein said inner tubular liner has a wall thickness of up to about 15 mil.

9. An improved fuel system conduit for transporting fuel and/or fuel vapors in an automobile comprising:

an inner tubular liner for contacting and containing the fuel and/or fuel vapor, said inner tubular liner comprising a thin walled tubular liner formed of fluorocarbon resin; and a protective cover for said liner comprising a metallic band wrapped in a tight helical configuration around said inner liner, said metallic band having a rectangular cross-sectional configuration.

10. The improved conduit of claim 9 wherein said inner tubular liner has a circular cross sectional configuration.

11. The improved conduit of claim 9 wherein said protective cover further comprises an outer plastic sheath substantially covering said metallic band.

12. The improved conduit of claim 9 wherein the thickness of said metallic band is from about 0.02 inch to about 0.04 inch.

13. The improved conduit of claim 12 wherein said ribbon comprises a carbon steel ribbon.

14. The fuel system conduit of claim 9 wherein said thin-walled tubular liner comprises a fluorocarbon resin selected from the group consisting of polytetrafluoroethylene, fluorinated ethylene propylene copolymer, perfluoroalkoxy resin, polychlortrifluoroethylene, ethylenetrichlortrifluoroethylene copolymer, ethylenetetrafluoroethylene copolymer, polyvinylidene fluoride, polyvinyl fluoride, and mixtures of two or more of these.

15. The conduit of claim 14 wherein said fluorocarbon resin comprises polytetrafluoroethylene.

16. The fuel conduit of claim 15 wherein said thin-walled tubular liner comprises an outer portion formed of polytetrafluoroethylene resin and an inner portion formed of a mixture of polytetrafluoroethylene resin and semi-conductive carbon.

17. The fuel conduit of claim 9 wherein said inner tubular liner has an inner diameter of from about 0.3 to about 0.4 inch and said metal band has a width of from about 0.1 to about 0.13 inch.

18. The fuel system conduit of claim 17 wherein the pitch of the windings of said metal band is about the inverse of the width of said metal band.

* * * * *